Figure 1:
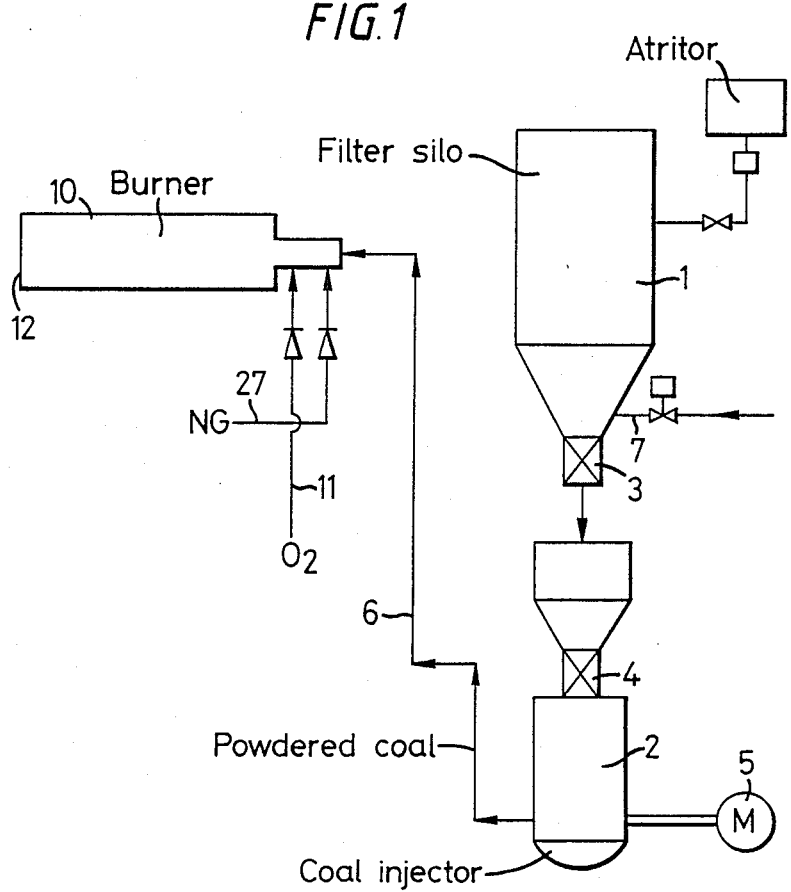

United States Patent [19]

Young

[11] Patent Number: 4,864,943
[45] Date of Patent: Sep. 12, 1989

[54] SYSTEM FOR BURNING PULVERIZED FUEL

[75] Inventor: Philip J. Young, Whitchurch, England

[73] Assignee: Air Products and Chemicals, Inc., Allentown, Pa.

[21] Appl. No.: 209,455

[22] Filed: Jun. 20, 1988

[30] Foreign Application Priority Data

Jun. 26, 1987 [GB] United Kingdom ............... 8715031

[51] Int. Cl.⁴ .......................... F23C 1/10; F23C 1/12
[52] U.S. Cl. ................................. 110/261; 110/263; 431/284
[58] Field of Search ............... 110/263, 260, 264, 262, 110/347, 261; 431/284, 285

[56] References Cited

U.S. PATENT DOCUMENTS

| 4,228,747 | 10/1980 | Smirlock et al. | 110/347 |
| 4,523,529 | 6/1985 | Poll | 110/347 X |
| 4,664,042 | 5/1987 | Nelson | 110/263 X |
| 4,704,971 | 11/1987 | Fleischer et al. | 110/347 X |

FOREIGN PATENT DOCUMENTS

| 0005438 | 11/1979 | European Pat. Off. |
| 1588078 | 4/1981 | United Kingdom . |
| 2141815 | 1/1985 | United Kingdom . |
| 2146417 | 4/1985 | United Kingdom . |
| 2165633 | 4/1986 | United Kingdom . |

Primary Examiner—Edward G. Favors
Attorney, Agent, or Firm—James C. Simmons; William F. Marsh

[57] ABSTRACT

Enhanced combustion of pulverized fuel in an oxy-fuel burner (10) is achieved by replacing the conventional pulverized fuel feed with a dense phase material flow transport system. This enables materials which would hitherto have been discarded as waste to be used as a viable energy source. In addition to greatly enhancing combustion the swirlers conventionally associated with the oxy-fuel burner (10) may be omitted.

19 Claims, 4 Drawing Sheets

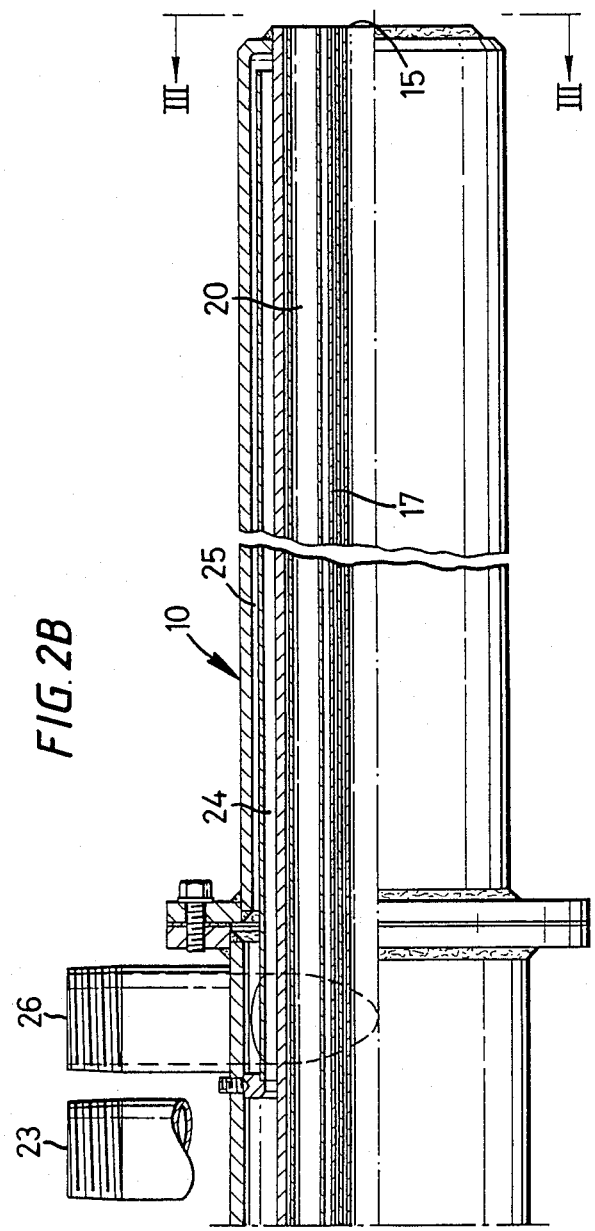

SYSTEM FOR BURNING PULVERIZED FUEL

This invention relates to a system for burning pulverised fuel and, more particularly but not exclusively, is concerned with a system for burning pulverised coal.

It has been proposed to burn pulverised fuel in an oxy-fuel burner. However, even with the use of pure oxygen it is difficult to obtain satisfactory combustion with certain fuels. In such cases the flame tends to be a relatively low temperature luminant flame and the ash may contain an appreciable quantity of uncombusted carbon.

The present invention, at least in its preferred embodiments, aims to provide more efficient combustion.

According to the present invention, there is provided a system for burning pulverised fuel, which system comprises an oxy-fuel burner, means for delivering oxygen to said oxy-fuel burner, and means for delivering pulverised material to said oxy-fuel burner, characterised in that said means for delivering pulverised material to said oxy-fuel burner comprises a dense phase material flow transport system.

Typically, said dense phase material flow transport system is capable of delivering between 20 and 30 kg of pulverised material to the oxy-fuel burner per 1 kg of propellant. The propellant, for example air or nitrogen, will typically be at 2–2.5 bar A.

By way of comparison current pulverised material flow transport systems used with air-fuel burners deliver between 20 and 30 kg of pulverised material per 50 kg of propellant.

Advantageously, the pulverised fuel will be between 100 and 200 mesh (150–75 $\mu$m).

Preferably, 60% to 80%, advantageously 70 to 75%, and more advantageously 75% by volume of said pulverised material will pass through a 75 $\mu$m filter.

Heretofore, it has been essential for oxy-fuel burners for burning pulverised fuel to incorporate swirlers either for the pulverised fuel or the oxygen. When using a dense phase material flow transport system this may be unnecessary. Furthermore, it has been found possible to obtain satisfactory combustion of pulverised materials hitherto regarded as having too low a carbon content for economic combustion. This is a most significant advantage since it enables materials which would hitherto have been discarded as waste to be used as a viable energy source. Furthermore, disposal of the ash produced by such materials will normally be far less expensive than disposal of the unburnt material.

If desired, passageways may be provided in the oxy-fuel burner to convey natural gas to the outlet of the burner. This may be particularly desirable where the carbon content of the pulverised material is very low and, more particularly, during start-up of a furnace.

Figure 2A:
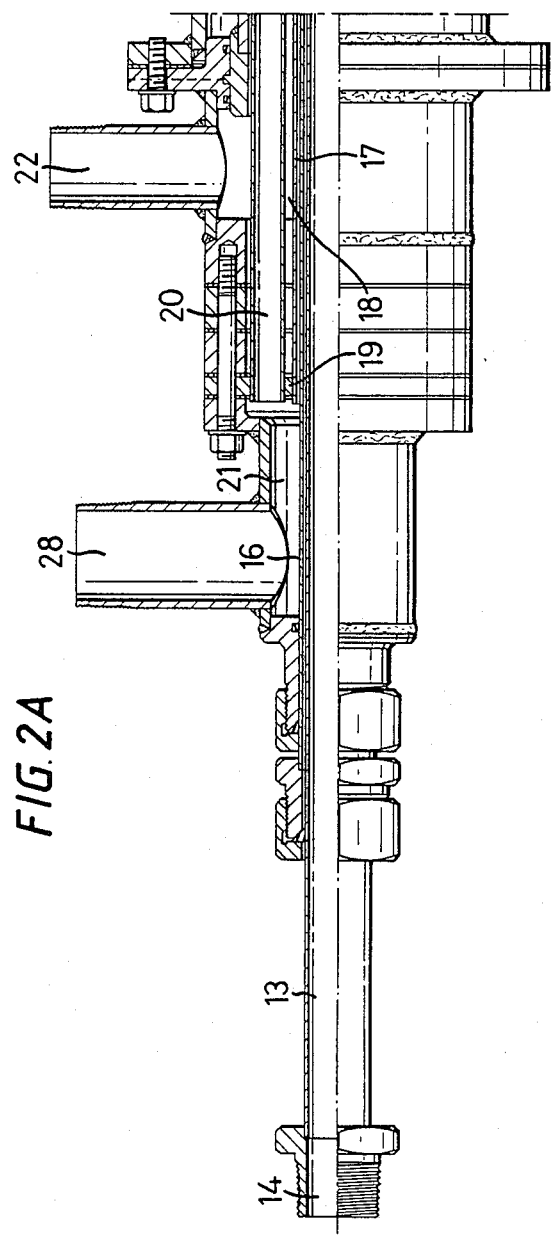
Figure 3:
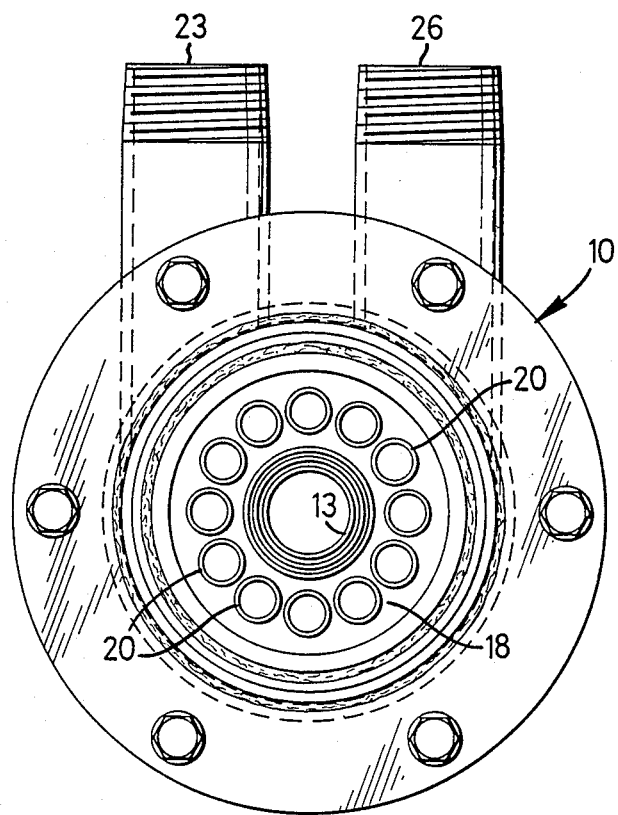

For a better understanding of the present invention reference will now be made, by way of example, to the accompanying drawings, in which:

FIG. 1 is a simplified flow sheet of a system for burning pulverised fuel in accordance with the invention;

FIGS. 2A and 2B together show a plan view, partly in cross-section, of an experimental oxygen/natural gas/pulverised fuel burner used in the system; and FIG. 3 is an end view looking in the direction of line III—III in FIG. 2.

Referring to FIG. 1 of the drawings 30t of pulverised coal (70% by volume of which will pass through a 75 $\mu$m filter) is stored in a fully enclosed silo 1. The pulverised coal is introduced into a coal injector 2 via an upper dome valve 3 and a lower dome valve 4. A motor 5 drives a mechanism which introduces the pulverised coal into a feed pipe 6 at a rate of 1000 kg/h. The pulverised coal is conveyed along the feed pipe 6 by air which is introduced through pipe 7 at a rate of 35 kg/h and at a pressure of about 2.3 bar A.

The equipment thusfar described is known as a "dense phase material flow transport system" and can be obtained from Simon-Macawber Limited in England.

The pulverised coal is introduced into the central tube of an oxy-fuel burner 10. Oxygen is supplied to the oxy-fuel burner 10 through pipe 11 and mixes with the pulverised coal at the outlet 12 of the oxy-fuel burner 10.

In tests the pulverised fuel and oxygen burnt with an intense high temperature flame. This was quite remarkable bearing in mind that the same pulverised coal had burnt with a low temperature luminant flare in a conventional oxy-fuel burner system. The ash had the appearance of silica sand and negligible residual carbon was found.

Referring now to FIGS. 2 and 3, the oxy-fuel burner 10 comprises a central tube 13 which is made of stainless steel and extends from the inlet 14 to the outlet 15 of the oxy-fuel burner 10. The central tube 13 extends through a tube 16 which itself extends through a tube 17. The tube 17 defines the radial inner wall of an annular oxygen supply passageway 18 which extends from a radial wall 19 to the outlet 15 of the oxy-fuel burner 10. Twelve natural gas pipes 20 are disposed in the oxygen-supply passageway 18 and extend from a header 21 to the outlet 15 as shown.

In use, pulverised coal from feed pipe 6 passes through the central tube 13 to the outlet 15 of the oxy-fuel burner 10. Oxygen from pipe 11 enters the burner 10 through oxygen inlet 22 and passes through the oxygen supply passageway 18 to the outlet 15 where substantially complete combustion takes place.

The tip of the burner 10 is cooled by water which enters the burner 10 through water inlet 23, flows through passageways 24 and 25 and leaves through water outlet 26.

If desired, natural gas can be admitted to the burner 10 via pipe 27, and natural gas inlet 28. The natural gas passes into the header 21 and thence passes to the outlet 15 via the natural gas pipes 20. The natural gas can be used to facilitate complete combustion particularly when the fuel has a low calorific value. Furthermore, the natural gas may be used during start-up.

What is claimed is:

1. A system for burning pulverized fuel, which system comprises:
   (a) a high temperature oxy-fuel burner,
   (b) means for delivering oxygen to said oxy-fuel burner, and
   (c) means for delivering pulverized material to said oxy-fuel burner, characterized in that:
   (d) said oxy-fuel burner includes a central passage extending from an inlet end to an outlet end for conducting pulverized material to said outlet end of said burner, disposed around said central passage a passage adapted to conduct oxygen from proximate said inlet end to said outlet end of said burner, and disposed within said oxygen passage and surrounding said central passage a plurality of conduits for conducting natural gas from a location proximate said inlet end of said burner to said outlet end of said burner.

(e) said means for delivering pulverized material to said oxy-fuel burner comprises a dense phase material flow transport system; whereby said fuel is combusted to an ash with the appearance of silica sand containing negligible amounts of carbon.

2. A system as claimed in claim 1, wherein said dense phase material flow transport system is capable of delivering between 20 and 30 kg of pulverised material to the oxy-fuel burner per 1 kg of propellant.

3. A system as claimed in claim 2, wherein said propellant is air or nitrogen.

4. A system as claimed in claim 2, wherein said propellant is at 2-2.5 bar A.

5. A system as claimed in claim 1, wherein said pulverised fuel is between 100 and 200 mesh (150-75 $\mu$m).

6. A system as claimed in claim 1, wherein 75% by volume of said pulverised material will pass through a 75 $\mu$m filter.

7. A system as claimed in claim 1, wherein said oxy-fuel burner does not incorporate a swirler.

8. A system as claimed in claim 1, including at least one passageway to convey natural gas to the outlet of the burner.

9. A system for burning pulverised fuel, which system comprises:
   (a) an oxy-fuel burner,
   (b) means for delivering oxygen to said oxy-fuel burner, and
   (c) means for delivering pulverized material to said oxy-fuel burner, characterised in that:
   (d) said means for delivering pulverised material to said oxy-fuel burner comprises a dense phase material flow transport system;
   (e) said dense phase material flow transport system is capable of delivering between 20 and 30 kg of pulverised material to the oxy-fuel burner per 1 kg of propellant, and
   (f) said pulverised fuel is between 100 and 200 mesh (150-75 $\mu$m).

10. A system as claimed in claim 9, wherein said propellant is air or nitrogen.

11. A system as claimed in claim 9, wherein said propellant is at 2-2.5 bar A.

12. A system as claimed in claim 9, wherein 75% by volume of said pulverised material will pass through a 75 $\mu$m filter.

13. A system as claimed in claim 9, wherein said oxy-fuel burner does not incorporate a swirler.

14. A system as claimed in claim 9, including at least one passageway to convey natural gas to the outlet of the burner.

15. A system for burning pulverized fuel, which system comprises:
   (a) a high temperature oxy-fuel burner,
   (b) means for delivering oxygen to said oxy-fuel burner, and
   (c) means for delivering pulverized material to said oxy-fuel burner, characterized in that:
   (d) said oxy-fuel burner includes a central passage extending from an inlet end to an outlet end for conducting pulverized material to said outlet end of said burner, disposed around said central passage a passage adapted to conduct oxygen from proximate said inlet end to said outlet end of said burner, and disposed within said oxygen passage and surrounding said central passage a plurality of conduits for conducting natural gas from a location proximate said inlet end of said burner to said outlet end of said burner.
   (e) said means for delivering pulverized material to said oxy-fuel burner comprises a dense phase material flow transport system;
   (f) said dense phase material flow transport system is capable of delivering between 20 and 30 kg of pulverized material to the oxy-fuel burner per 1 kg of propellant, and
   (g) 75% by volume of said pulverized material will pass through a 75 $\mu$m filter; whereby said fuel is combusted to an ash with the appearance of silica sand containing negligible amounts of carbon.

16. A system as claimed in claim 15, wherein said propellant is air or nitrogen.

17. A system as claimed in claim 15, wherein said propellant is at 2-2.5 bar A.

18. A system as claimed in claim 15, wherein said oxy-fuel burner does not incorporate a swirler.

19. A system as claimed in claim 15, including at least one passageway to convey natural gas to the outlet of the burner.

* * * * *